(12) United States Patent
Trammell (10) Patent No.: US 7,753,047 B1
(45) Date of Patent: Jul. 13, 2010

(54) EASY-LOAD BARBECUE GRILL STAND AND CART

(76) Inventor: Melvin G. Trammell, 7114 Lake Van Dr., Dexter, NM (US) 88230

( * ) Notice: Subject to any disclaimer, the term of this patent is extended or adjusted under 35 U.S.C. 154(b) by 1230 days.

(21) Appl. No.: 11/259,990

(22) Filed: Oct. 26, 2005

Related U.S. Application Data (60) Provisional application No. 60/622,932, filed on Oct. 27, 2004.

(51) Int. Cl.
*F24C 5/00* (2006.01)
(52) U.S. Cl. ............................ 126/50; 126/9 B; 126/30; 126/40
(58) Field of Classification Search ................... 126/50, 126/40, 30, 25 R, 9 R, 9 B
See application file for complete search history.

(56) References Cited

U.S. PATENT DOCUMENTS

| 4,949,701 | A | 8/1990 | Krosp et al. |
| 4,955,358 | A | 9/1990 | Harris et al. |
| 5,318,322 | A | 6/1994 | Home |
| 5,638,808 | A | 6/1997 | Home |
| 2002/0069865 | A1 | 6/2002 | Stewart et al. |
| 2003/0029973 | A1* | 2/2003 | Stephen et al. .............. 248/129 |

* cited by examiner

*Primary Examiner*—Alfred Basichas
(74) *Attorney, Agent, or Firm*—Rod D. Baker (57) ABSTRACT

A barbecue grill stand. A stand is provided for supporting a barbecue grill. The stand has a top section and a bottom section. The top section may be independently used without the bottom section to provide for a compact apparatus that may be rested on a table, the tailgate of a pickup truck, or the like. The top section may be engaged upon the bottom section to provide a full-size barbecue grill stand that may free-stand upon the floor or ground. The top section connects and disconnects with and from the bottom section simply and without the use of tools or complicated fasteners. The apparatus employs one or two sets of wheels to provide for easy movement, and can be easily and quickly collapsed into a small space for transportation and storage between uses.

8 Claims, 8 Drawing Sheets

EASY-LOAD BARBECUE GRILL STAND AND CART

CROSS-REFERENCE TO RELATED APPLICATIONS

This application claims the benefit of the filing of U.S. Provisional Patent Application Ser. No. 60/622,932, entitled "Easy-load Barbecue Grill Stand and Cart," filed on Oct. 27, 2004, and the specification thereof is incorporated herein by reference.

BACKGROUND OF THE INVENTION

1. Field of the Invention (Technical Field)

The present invention relates to barbecue grills, particularly portable barbecue grills, and specifically a grill apparatus that is simple in construction, easy to assemble and disassemble, and is well-suited for use on the tailgate of a conventional pickup truck.

2. Background Art

"Tailgating" is a pastime rapidly rising in popularity around the United States. Tailgating often involves using the tailgate of a pickup truck as the table for preparing foods and beverages at a large social event, such as a sporting event. Barbeque foods are popular at tailgating and other events. However, it can sometimes be difficult to transport and use a barbeque grill to and from a "tailgating" or other picnic or social event. The present invention provides an easily transported barbeque grill stand.

Previous efforts in the background of the present disclosure are typified by the following patent publications: U.S. Patent Application Publication No. 2002/0069865 to Stewart et al.; U.S. Pat. No. 5,638,808 to Home; U.S. Pat. No. 5,318,322 to Home; U.S. Pat. No. 4,949,701 to Krosp et al.; and U.S. Pat. No. 4,955,358 to Harris et al. The disclosures of these publications are incorporated herein by reference. However, these previous disclosures do not teach barbecue grill stands having the simplicity of fabrication, and the facility of use, of the apparatus of the present disclosure.

SUMMARY OF THE INVENTION

Disclosure of the Invention

There is provided according to the invention a barbecue grill apparatus. The advantageous features of the apparatus are found primarily in the inventive stand for the grill. The stand has an innovative configuration that is unusually simple, permitting the stand to be fully assembled for use, and also partially dis-assembled for transportation and storage, very simply and quickly. The stand of the apparatus is provided with wheels to function dually as a wheeled cart. The barbecue grill stand/cart according to the invention can be configured in a special short-legged configuration, so to be well suited and specially adapted for use in conjunction with a pickup truck. More particularly, the short-legged "compact size" configuration of the apparatus is readily placed on the lowered tailgate of an ordinary pickup truck, and rollable into and out of the bed of the truck, so to permit barbecue cooking on the tailgate during "tailgate parties" at sporting events and the like.

In one embodiment, the collapsible barbecue grill stand comprises a top section for supporting a grill, this top section in turn featuring a rectangular grill support, legs extending down from each corner of the support; and a stub bracket on the lower end portion of each the leg; and the stand also comprising a bottom section reversibly connectable to the top section, the bottom section featuring a rectangular wheeled frame and a column extending up from each corner of the frame, each column having a top end engageable into a corresponding one of the stub brackets, such that when the columns are engaged with the stub brackets, the top section rests upon the bottom section in a position to receive a grill for use in the top section. The apparatus further optionally includes at least one shelf having stems extending therefrom and socket means upon the top section, wherein the stems are removably insertable into corresponding ones of the socket means to dispose the shelf horizontally connected to the top section. There may also be a socket means upon the shelf; a wheel bracket; an auxiliary wheel rotatably mounted upon the wheel bracket; and a wheel stem extending from the wheel bracket, so that the wheel stem is removably insertable into the socket means upon the shelf to removably attach the auxiliary wheel to the shelf. The grill support and the shelf preferably are fabricated in part from hollow metal tubing, and the "socket means" simply are open ends of the tubing. Preferably, the top section is removable from the bottom section, and the top section is storable within the interior volume of the bottom section. In one preferred but optional embodiment, the top ends of at least a first pair of the columns are tapered, and a first pair of the stub brackets are pivotal about the tapered top ends when a second pair of the stub brackets are disengaged from a second pair of the columns.

There also is disclosed a stand for a barbecue grill, comprising a top section for receiving and holding a grill, the top section temporarily engageable with a bottom section having four vertically extending columns, and the top section having brackets thereon into which the top ends of the columns are removably insertable. The top section has a frame having four legs extending downward therefrom, and the brackets are disposed near the lower ends of the legs. Again, the top section is removable from the bottom section, and the top section may be stowed within the interior volume of the bottom section.

The stand for a barbecue grill, as disclosed herein, also may comprise a top section for receiving and holding a grill, a bottom section having a plurality of vertically extending columns, and means for reversibly mounting the top section upon the bottom section; wherein this means for reversibly mounting consists of brackets on the top section into which top ends of corresponding ones of the columns are removably insertable. Thus the need is eliminated for screws, bolts, or similar complicated or easily lost fasteners for connecting the top and bottom sections together.

A primary object of the present invention is to provide a barbecue grill apparatus that is simple and inexpensive to make.

Another object of the invention is to provide a grill apparatus that is simple to assemble for use, and to-disassemble for transportation and storage.

A primary advantage of the present invention is its simplicity.

Another advantage of the invention is that the apparatus may be adapted for use in a short-legged embodiment, for use on the lowered tailgate of a pickup truck (or other shelf-like location) for use.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS

Best Modes for Carrying Out the Invention

This disclosure is of a barbecue grill apparatus, particularly a grill stand, which is easily and readily assembled, disassembled, and reconfigured for varying uses.

The stand has a top section and a bottom section. The top section may be independently used without the bottom section to provide for a compact apparatus that may be rested on a table, the tailgate of a pickup truck, or the like. The top section may be engaged upon the bottom section to provide a full-size barbecue grill stand that may free-stand upon the floor or ground. The top section connects and disconnects with and from the bottom section simply and without the use of tools or complicated fasteners. The apparatus employs one or two sets of wheels to provide for easy movement, and can be easily and quickly collapsed into a small space for transportation and storage between uses.

The apparatus is constructed from materials generally known in the art, and preferably the frame portions of both the top and bottom sections are manufactured from lightweight, rigid, hollow metal tubing, such as aluminum tubing or the like, or conduits fabricated from other durable metal alloys. Alternatively, the components may be fabricated from heavier metals, including steel. As seen in the drawing figures, the tubing preferably is square tubing, i.e., it is fashioned with a square lateral section, although alternative embodiments could be constructed of round (circular cross section) tubing. The manufactured sections preferably are welded or brazed together at the joints, although other suitable means of juncture, including screws and brackets, may likewise be employed during construction.

A significant advantage of the disclosed apparatus is the ease with which it is transported and used. The grill stand can be moved into and out of the cargo space of, for example, a pickup truck. Also, it is easily assembled and dissembled.

Figure 1:
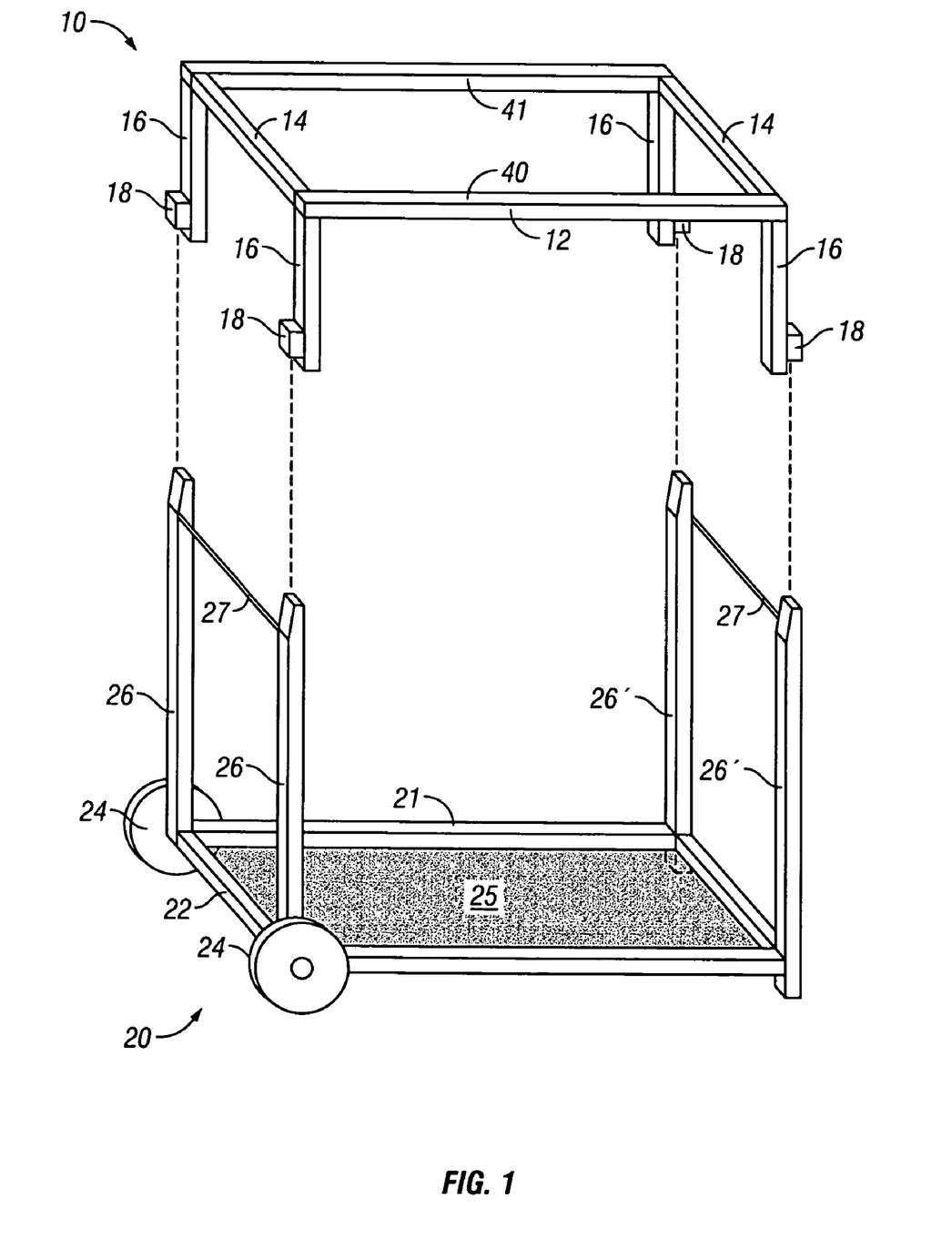
FIG. 1 is an exploded perspective front view of the apparatus of this disclosure, showing the top section of a grill stand and the bottom section of a grill stand apparatus according to the present invention.

The inventive grill stand apparatus includes two principal components—a top section 10 and a bottom section 20 as seen in FIG. 1. These two sections 10, 20 are interconnectable, the short legs 16 of the former being engageable with the corner columns 26, 26' of the latter, as suggested in the figure.

Referring to FIG. 1, it is seen that the grill stand features the top section 10 defining a rigid frame. The frame of this top section may be, by way of example only, about 32"×20"×10". A rectangular grill support 12 has parallel front 40 and back 41 members, held apart and joined by shorter top side members 14. Extending rigidly downward from the corners of the grill support 12, normal to the plane defined by the grill support 12, are four top short legs 16. Short legs 16 may be, by way of example only, about 10 or 11 inches long. Each top short leg 16 has rigidly attached thereto a short, hollow, column stub bracket 18. As seen in FIG. 1, each column stub bracket 18 is attached at or near the lower or distal end portion of a corresponding one of the top short legs 16. The stub brackets 18 are generally parallel to the front and back members 40, 41 of the grill support 12. Each column stub bracket 18 has four vertical walls (one such wall being secured to a top short leg 16), but the top and bottom of each stub bracket 18 are open, so that the bottom section columns 26, 26' can be inserted vertically upward into, or downward into, corresponding ones of the stub brackets 18. Being hollow, the column stub brackets 18 function as sockets for receiving therein the bottom section columns 26, 26', as will shortly be described.

Also as seen in FIG. 1, the bottom section 20 features a rectangular rigid bottom frame 21 essentially the same in dimensions and configuration as the grill support 12. One side member 22 of the bottom frame 21 is equipped with an axle or axles (not shown, but generally according to convention) mounting rotatable wheels 24 whereby the bottom section 20 (and the complete apparatus) may be wheeled across a floor, the ground, or other supporting surface for convenient transportation across short distances. The rigid bottom frame 21 optionally but preferably has a thin, rigid, planar shelf 25 upon which items, such as a propane tank and cooking accessories, may be placed for use or storage. The bottom section 20 has four vertical, mutually parallel bottom section columns 26, 26' extending upward from each of the corners of the bottom frame 21.

The bottom ends of two of the columns 26, 26 terminate at and are rigidly attached to the bottom frame 21 in the vicinity of the wheel 24 axle adjacent side member 22. The bottom ends of the other two columns 26', 26' extend downward beyond and below the bottom frame 21 a slight distance, as seen in FIG. 1, to serve as support legs for the bottom section 20. It is apparent to one skilled in the art that the distance the columns 26', 26' extend below the frame 21 is about equal to or slightly less than the radius of a wheel 24, so that the bottom section 20 situates about level (with the plane defined by the bottom frame 21 being about parallel to the floor or ground) when the wheels 24 and the bottom ends of the stand columns 26', 26' rest upon the ground.

It is seen that the top or upper ends of all four columns 26, 26' are tapered, or chamfered, somewhat gradually, to promote easy insertion of the top ends of the columns 26, 26' into the column stub brackets 18. The inside dimensions of the column stub brackets 18 are slightly greater than the maximum outside dimensions of the columns 26, 26', so that each one of the columns can be snugly, but removably, inserted into a corresponding one of the stub brackets 18. Cross braces 27 support and stabilize the respective pairs of columns 26, 26 and 26', 26' as seen in FIG. 1. Also, the insertion of the tops of the columns 26, 26' may be controlled by the contact of the cross-braces 27 with the edges of the stub brackets 18.

Figure 1A:
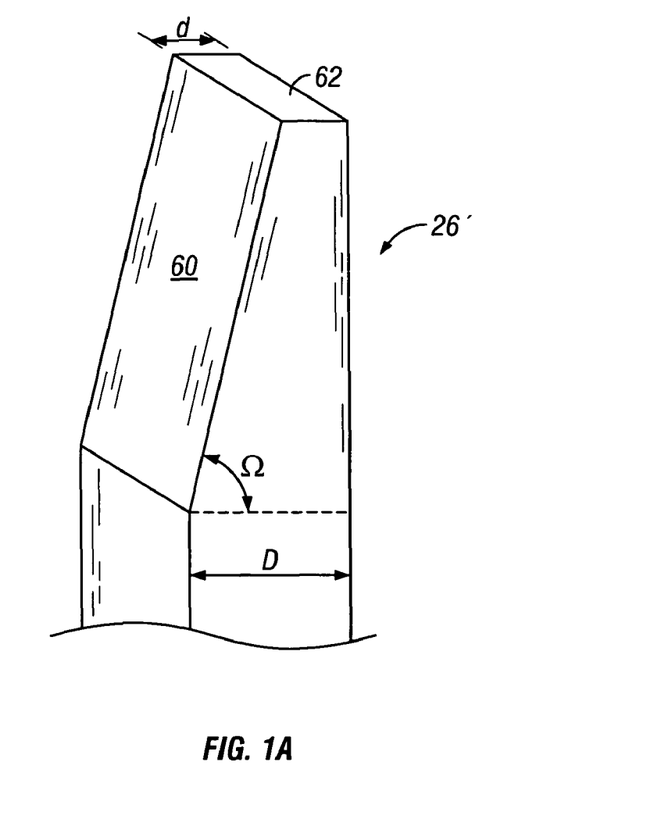
FIG. 1A is an enlarged perspective view of a portion of the apparatus depicted in FIG. 1.

FIG. 1A is an enlarged view of the top ends of the columns 26', 26'. It is seen that each end is tapered to define a chamfered face 60 that is inclined in relation to vertical. The top ends of at least the front columns 26', 26' are so configured, but, as seen in FIG. 1, the top ends of the rear columns 26, 26 preferably are likewise defined. The angle Si included between the chamfered face 60 and the horizontal preferably is greater than about 45 degrees, and more preferably is between approximately 55 degrees and about 70 degrees. The angle of inclination 52 of the chamfered face 60 and the height of the chamfered face provide that there remains a generally horizontal top 62 (or at least a rectangle of top edges). However, the depth dimension d of the column top 62 preferably is less than 50% of the overall depth dimension D of the column 26' and preferably is between about 20% and about 35% of total depth dimension D. Not only does the tapered top end of each column 26' promote easy insertion of the column 26' into a top short leg 16, such a configuration of the columns 26', 26' also aids in the ready disassembly of the apparatus for wheeled placement of the top section 10 into a pickup truck bed, for example, as shall be explained further herein.

FIG. 1 shows, therefore, how the top section 10 can be placed down upon and to rest upon the bottom section 20. The column stub brackets 18 are simply aligned vertically with the columns 26, 26', and the top section is lowered down so that the top end of each column 26, 26' is engageably inserted into a respective stub bracket 18. The column tops slide smoothly, with only minor clearance, into the interior hollows of the stub bracket brackets 18 until the edges of the stub brackets 18 contact with and rest upon the cross-braces 27. In an acceptable alternative embodiment, the maximum outside dimensions of the columns 26, 26' are greater than the inside dimensions of the stub bracket brackets 18, so that the insertion of the tops of the columns 26, 26' into the stub brackets is completed when the tapered portions of the tops of the columns are within the stub brackets, and the brackets 18 rest upon the columns themselves, that is, the non-tapered full-sized cross sections of the columns 26, 26'. Other alternative modes of regulating the extent of insertion of the columns into the stub brackets will be apparent to one skilled in the art, and are within the scope of this invention. It is very preferable, however, that the junction of the columns 26, 26' into the corresponding stub brackets 18 is maintained by gravity, e.g., the weight of the top section 10, rather than by mechanical fasteners.

Figure 2:
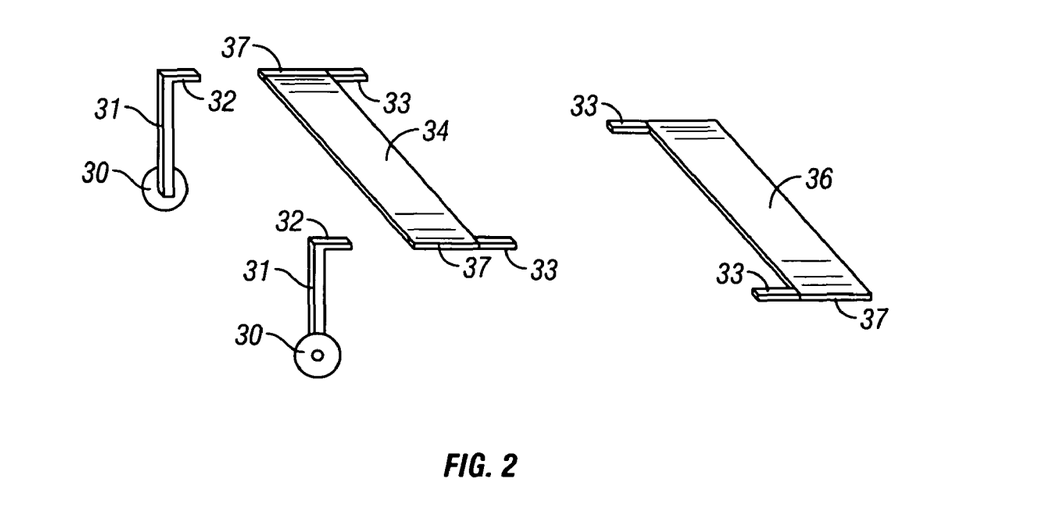
FIG. 2 is an exploded perspective front view of side shelves and auxiliary wheels components of the grill stand apparatus of this disclosure, useable with the apparatus seen in FIG. 1.
Figure 3:
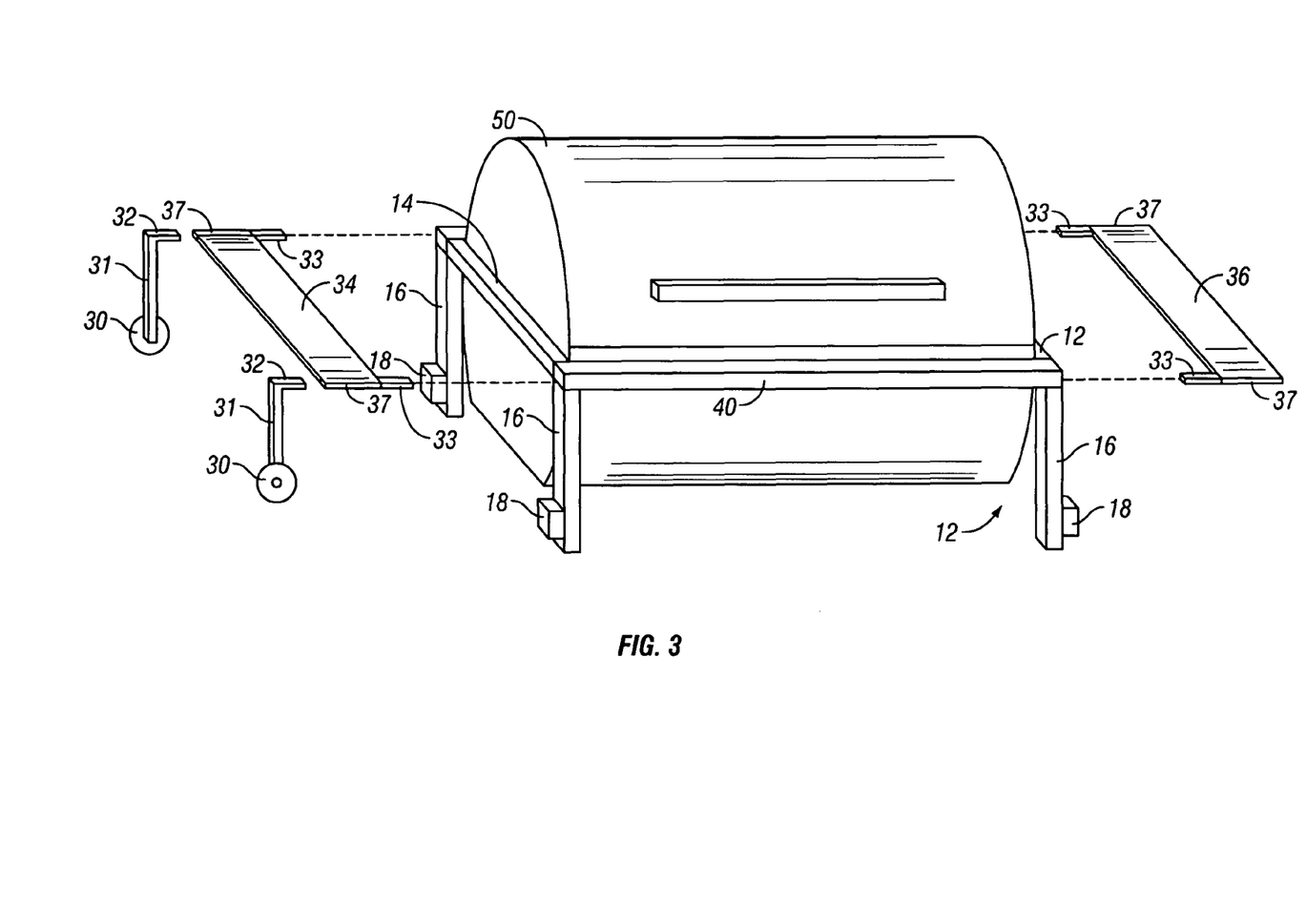
FIG. 3 is a front partially exploded view of a barbecue grill disposed within the top section of the apparatus seen in FIG. 1, showing how the side shelves and auxiliary wheels components are attachable to the top section.

Combined reference is made to FIGS. 2 and 3. The apparatus of the invention includes a set of auxiliary wheels 30 rotatably mounted upon wheel brackets 31. Wheel stems 32 are rigidly attached to, or integral with, each wheel bracket 31 and extend there from at a ninety-degree angle. Also provided is a pair of planar auxiliary shelves 34, 36 as seen in FIGS. 2 and 3. Each shelf 34, 36 also has a pair of rod-like shelf stems 33 that extend laterally from each end thereof, as best seen in FIG. 2. In a preferred embodiment, a support tube 37 is affixed at each end of each shelf 34, 36, from one end of which the shelf stems 33 may project. Further, as best indicated in FIG. 3, the wheel stems 32 are frictionally insertable into the open ends of the of the support tubes 37, so that the auxiliary wheels 30 are removably attachable to the one shelf 34 by the simple expedient of snugly inserting the wheel stems 32 into the shelf support tubes 37.

Further reference to FIG. 3 shows how the shelves 34, 36 are removably attachable to the top section 10 of the apparatus. The ends of the longer, tubular, front and back members 40, 41 of the grill support 12 are left open, thereby providing access to their hollow interiors. The shelves 34 and 36 may be temporarily but securely attached to the top section 10 by frictionally inserting the shelf stems 33 into the open ends of the front and back members 40 and 41. It is apparent therefore that the shelves 34 and 36 are approximately as long as the grill support 12 is deep (front to back). Further, the outside dimensions of the shelf stems 33 are just slightly less than the inside dimensions of the tubular front and back members 40, 41, to provide for the secure but removable insertion of the former into the latter.

Figure 6:
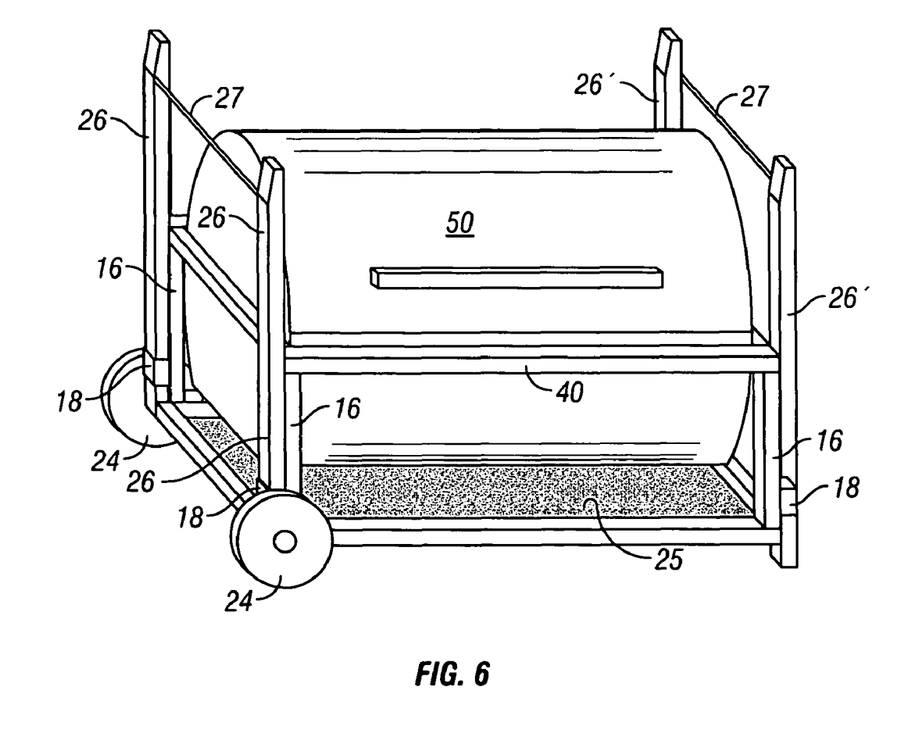
FIG. 6 is a front perspective view of an embodiment of the apparatus shown in a "stowed" configuration for storage.

A covered grill 50 generally according to convention (shown in the drawing figures with rotatable cover closed) is mounted (as with bolts and brackets or any other suitable means) within the grill support 12 as shown in FIGS. 3 and 6.

Figure 4:
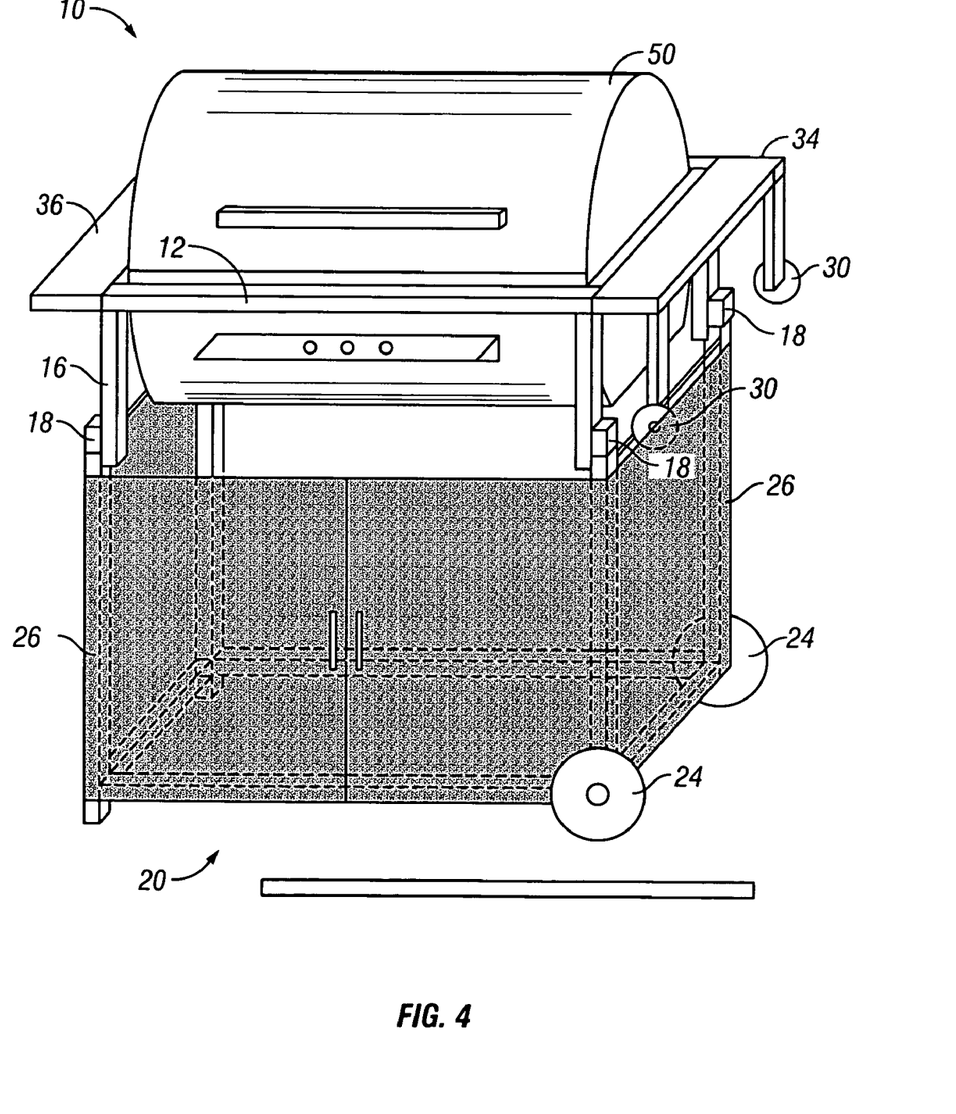
FIG. 4 is a front perspective view of the grill stand apparatus, fully assembled and with a grill installed thereon, and including an enclosure about the bottom section, for use in the "full size" configuration.
Figure 5:
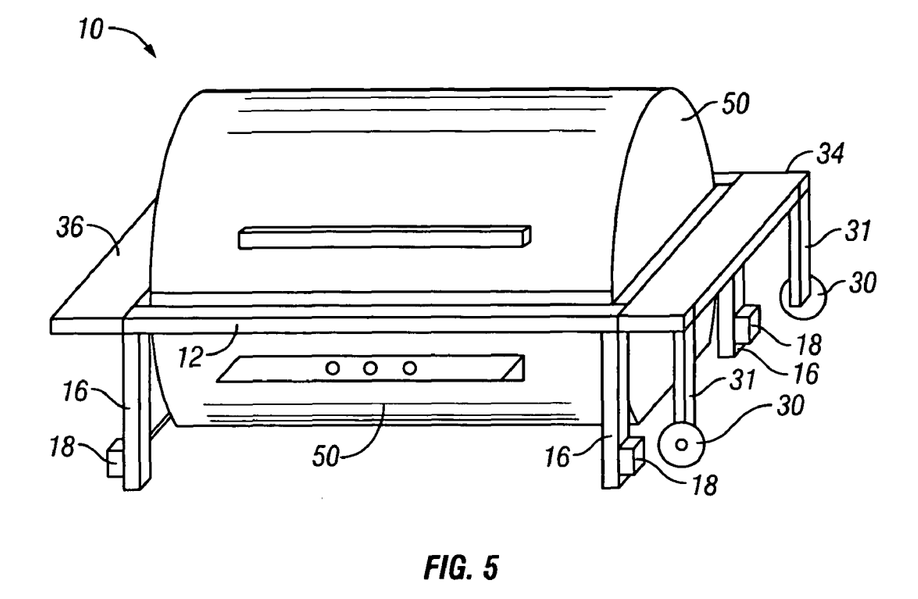
FIG. 5 is a front perspective view of the grill stand apparatus fully assembled in the "compact size" configuration.

Attention is invited to FIG. 5. There is depicted the apparatus assembled in its "compact size" configuration, as per the teachings of FIGS. 1-4. In this compact configuration, the apparatus is well-suited for use on the lowered tailgate of a pickup truck, for example, at a "tailgate" party at a sporting event. Two of the top section short legs 16 support one end of the top section 10 with the grill 50 thereon, while the auxiliary wheels 30 support the other end. The shelves 34 and 36 are in place to hold cooking utensils, condiments, food items to be grilled, etc. Its compact size, especially its abbreviated height, permits the one end of the grill stand/cart to be lifted, and the apparatus to be wheeled (on auxiliary wheels 30) in and out of the back (bed) of the pickup truck (e.g., on and off the lowered tailgate) for transportation to and from, and use at, the cooking site.

Figure 7:
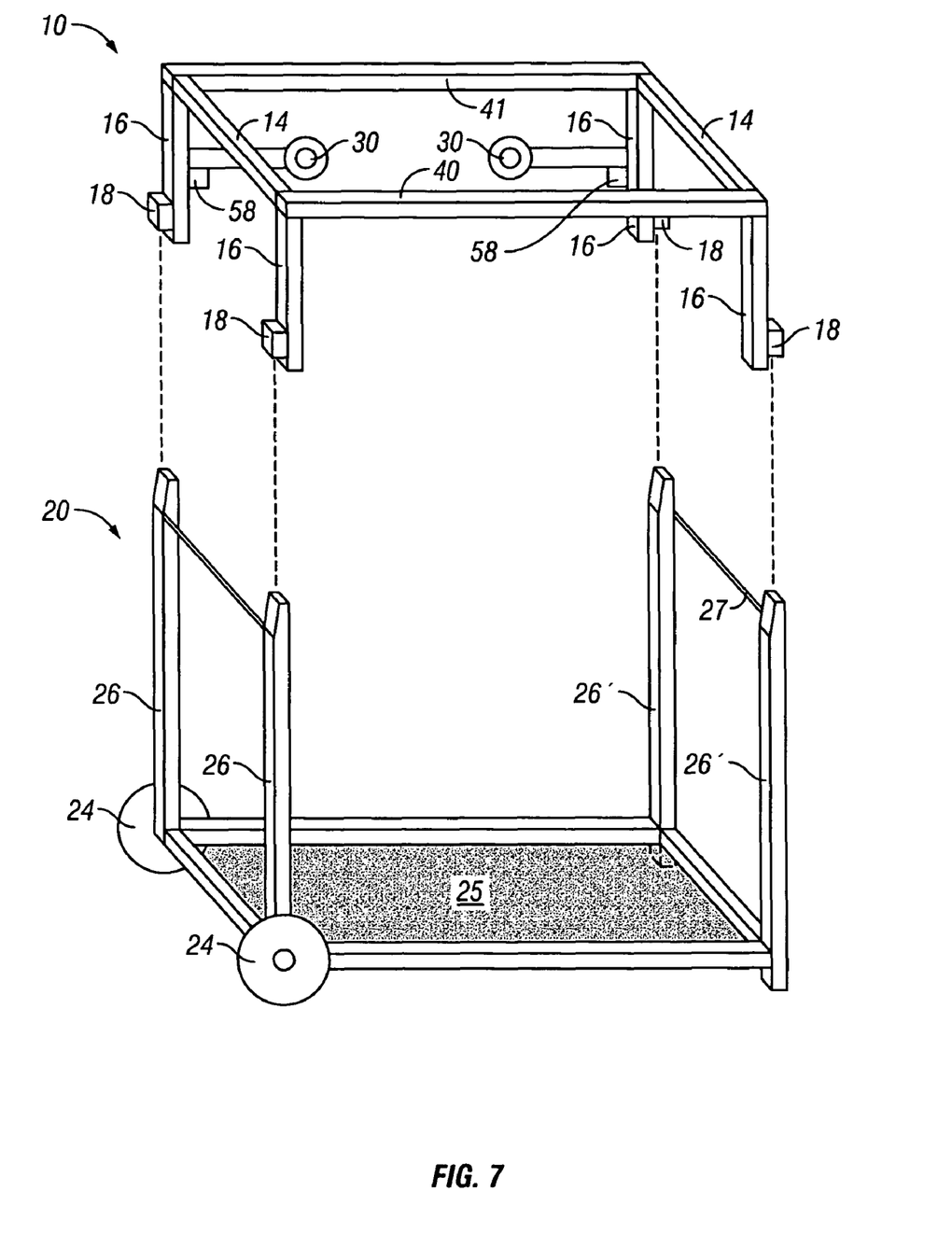
FIG. 7 is a partially exploded perspective front view of another embodiment of the grill stand apparatus, with storable wheels in a stowed position.

Reference is made to FIG. 7. It is seen that the short legs 16 optionally may be provided with auxiliary stub brackets 58, 58' in which wheels 30 may be inserted when not in use, particularly during storage of the apparatus. The exterior shape and dimensions of the wheel brackets 31 correspond to the inside shape and size of the stub brackets 58, 58', such that the latter can be removably inserted into the former, as seen in FIG. 7.

FIG. 4 shows that the apparatus alternatively can be deployed in a "full size" configuration, whereby the grill 50 is at or about the user's waist level while the apparatus stands, self-supporting, on the ground. The top section 10 with the grill 50 in place is lowered into position upon the bottom section 20 in the manner previously described in reference to FIG. 1. The column stub brackets 18 are lowered down and around the top ends of the columns 26, 26' so that the top section 10 is securely, but removably, mounted upon the bottom section 20. The connection between the two sections 10 and 20 is maintained mainly by the force of gravity, although there may be some frictional engagement of the tops of the columns 26, 26' into the stub brackets 18. FIG. 4 also shows that the bottom section 20 of the apparatus optionally may be provided with four thin walls mounted vertically upon the columns 26, 26' to enclose the bottom section in a container or cabinet-like manner, generally according to concepts known in the art.

Significantly, however, the full-size version of the apparatus as shown assembled in FIG. 4 can be moved upon the ground by simply lifting the columns 26' from contact with the ground, and wheeling the apparatus in a cart-like manner upon the main wheels 24. Also, it is noted that even in the full-size configuration of FIG. 4, the apparatus optionally but preferably may feature the use of the shelves 34, 36, with or without the auxiliary wheels 30 in place.

The apparatus can be "broken down" for transport and storage by merely withdrawing the shelf stems 33 from the top section 10, and the columns 26, 26' from the stub brackets 18. Also, an advantage of the invention is shown in FIG. 6, showing how the entire apparatus can be re-configured to have a comparatively reduced size for transportation or storage. To achieve the "stowed" configuration of FIG. 6, the top section 10 (with grill 50 attached) is merely lifted off the bottom section 20 (thus withdrawing the tapered tops of the columns 26 26' from the stub brackets 18), and then lowered back down again. The top section 10 is lowered down into the bottom section, but with the tops of at least one pair of the columns 26, 26' in registration with and inserted through at least one pair of the stub brackets 18. With the columns 26, 26' (one or both pairs disposed through the stub brackets 18, the top section is removably secured within the lower section 20. In this configuration, the body of the grill 50 and the top section 10 are essentially inside the volume defined by the bottom section 20, so that the collapsed apparatus occupies much less space for transportation and storage.

Figure 8:
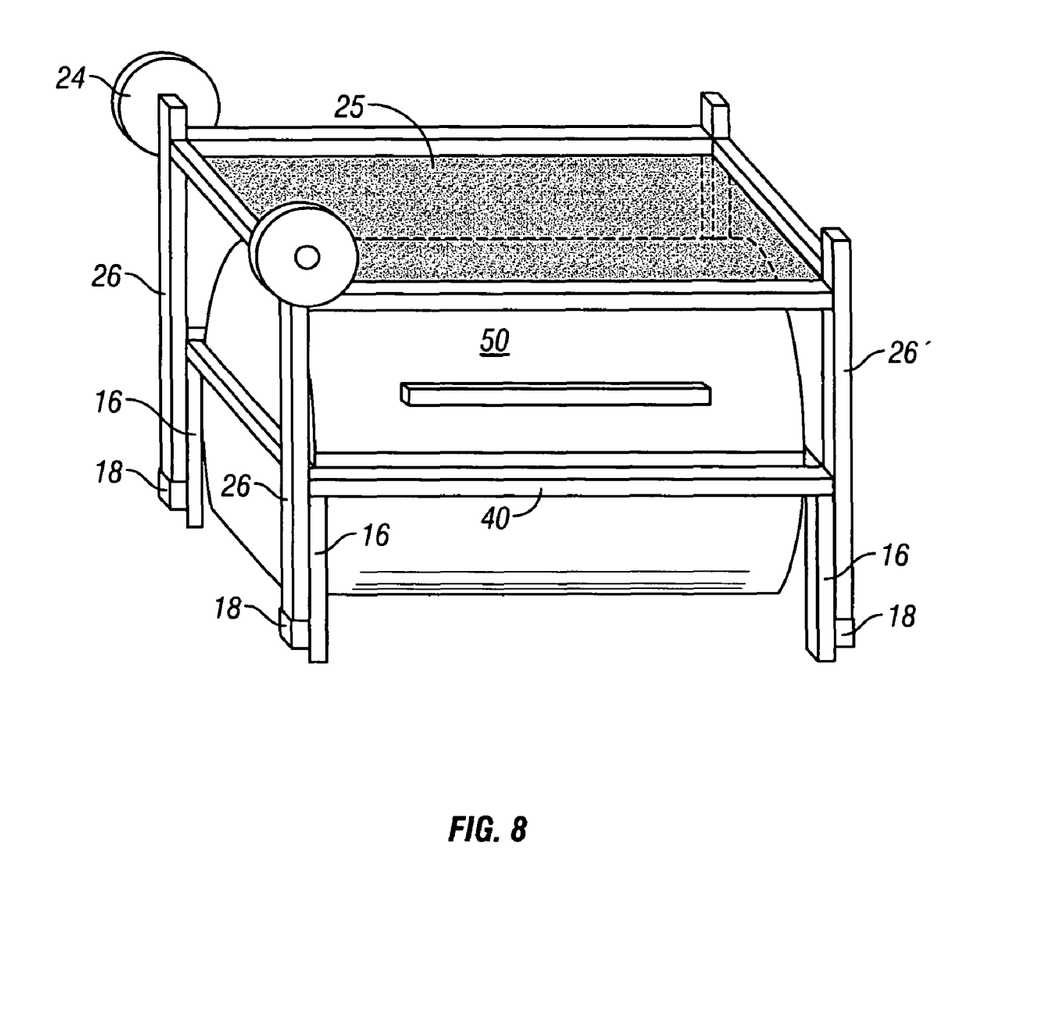
FIG. 8 is a front view of the apparatus in an alternative collapsed condition for stowage for transportation or storage.

Reference to FIG. 8 illustrates the apparatus in an alternative stowed condition, similar to that depicted in FIG. 6, except that the bottom section 20 is inverted and disposed above the top section 10 with grill 50 attached. The bottom portion is inverted, and the columns 26, 26' disposed through the stub brackets 18. It is noted that the covered grille portion 50 is fully contained within the frame defined by the columns 26, 26'. This configuration is suited for long-term storage of the apparatus, but is not as conveniently transported as the configuration seen in FIG. 6.

Figure 9:
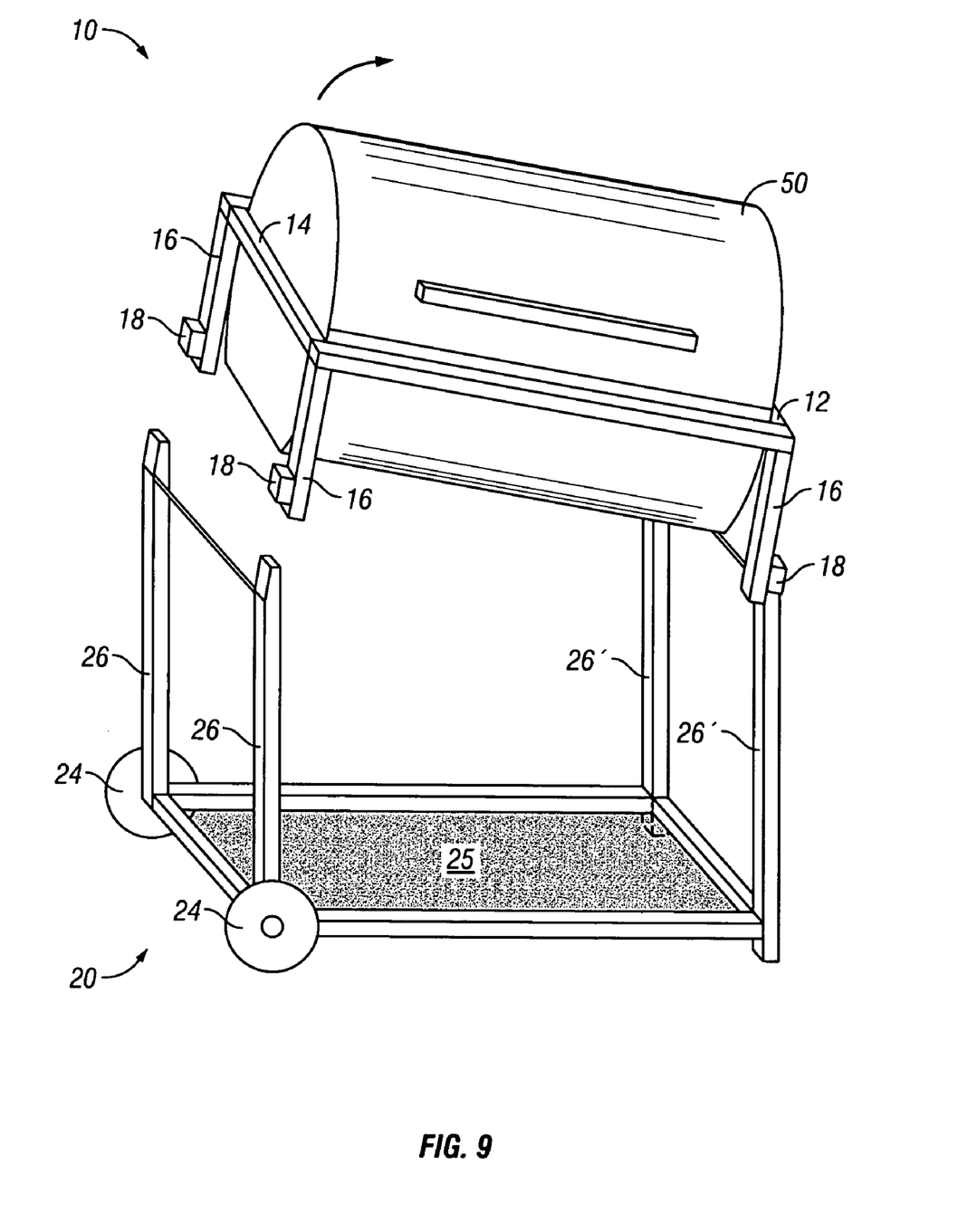
FIG. 9 is a front view of the assembled apparatus shown with the top section tipped at an angle to facilitate its placement upon a table or truck tailgate (not shown).

FIG. 9 assists in explaining an advantage of the invention. One preferred use for the apparatus is the placement of the upper portion 10 of the apparatus onto the tailgate of a pickup truck or the like. FIG. 9 shows that the top portion 10 of the apparatus can be tilted up and away from the bottom portion 20 in order to permit the top portion to be shifted or wheeled onto a tailgate. For example, the entire apparatus deployed in the "full size" configuration with the top section 10 removably mounted upon the bottom portion 20 (as seen in FIG. 4) can be wheeled across the ground on wheels 24 to a location immediately adjacent the table, tailgate, or the like. The front columns 26 and wheels 24 are moved into place next to the tailgate or table. Then, the entire top portion 10, including the covered grill 50 thereon, is tipped as suggested in FIG. 9. The end of the top section (left end in FIG. 9) closest to the tailgate is lifted and pivoted upward, withdrawing the stub brackets 18 free and clear of the tops of front columns 26, 26. As suggested in FIG. 9, the stub brackets 18 at the other end of the apparatus are able to pivot slightly about the top ends of the back columns 26, 26', due to the tapered upper ends of the back columns as seen in FIG. 1A. Because the upper ends of the back columns 26', 26' feature the chamfered face 60, the stub brackets 18 have some freedom of pivotal movement around the topmost segments of the back columns, permitting the apparatus to be shifted into the position seen in FIG. 9. Further, the chamfered top ends of the front columns 26, 26 permit the front stub brackets 18 to be smoothly slipped from the front columns without the need to lift the entire top section 10 from the bottom section 20 while maintaining the top section 10 essentially level or parallel to the ground. In the absence of chamfered top ends on the columns 26, 26' it is difficult or impossible to tip the top section 10 into the position seen in FIG. 9; rather, the user can disengage the top section from the bottom section 20 only by maintaining all the short legs 16 parallel to the columns 26, 26' and lifting the entire top section at once in a level position.

In advantageous contrast, once the top section has been lifted into the position seen in FIG. 9, the apparatus can be shifter slightly closer to the tailgate, and the front short legs 16 of the top section 10 lowered onto the tailgate or table. The front short legs 16, resting on the tailgate, can then serve as the supporting fulcrum to permit the rear short legs up and off the rear columns 26'. Accordingly, the user need never lift the entire weight of the top section 10 all at once, since some of the weight thereof is at all times supported by at least a pair of the short legs 16.

Once the back short legs have been lifted clear of the rear columns 26' of the bottom section, the entire top section can then be slid, scooted or "walked" the rest of the way onto the tailgate until all the short legs 16 can rest on the tailgate or bed of the pickup truck, or on the table, etc. Notably, the entire process of detaching the top section 10 and moving it onto the tailgate can be eased significantly if the auxiliary wheels 30 are installed upon the top section 10 as depicted in FIG. 4. The entire apparatus, as seen in FIG. 4, is moved up to the tailgate or table, as described immediately above, with the auxiliary wheels 30 near the tailgate or table. The top is pivoted as seen in FIG. 9 so that the auxiliary wheels 30 may be moved over, and then lowered onto, the tailgate—at which time the rear short legs 16 are lifted clear of the back columns 26' of the lower section 20, permitting the top section 10 to be wheeled on the auxiliary wheels 30 (FIG. 4) and jockeyed into the desired position on the table or tailgate. The grill 50 can then be used on the tailgate, in the compact position (similar to as seen in FIG. 3).

A person of ordinary skill in the art will appreciate that wheels optionally may be provided at the bottom of all four columns 26, 26' of the bottom section 20, so that the apparatus can be wheeled in a cart-like manner when in the full-size configuration of FIG. 4.

The apparatus can be re-used and re-assembled, in either the compact or the full-size configurations, by reversing the processes described above. Use of the shelves 34, 36 is optional but preferable.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents.

I claim:

1. A collapsible barbecue grill stand comprising:
   a top section for supporting a grill, said top section comprising:
   a rectangular grill support;
   a leg extending down from each corner of said support;
   a stub bracket on a lower end portion of each said leg; and
   top section socket means;
   a bottom section reversibly connectable to said top section, said bottom section comprising:
   a rectangular wheeled frame; and
   a column extending up from each corner of said frame, each said column having a top end engageable into a corresponding one of said stub brackets;

at least one shelf comprising:
    stems extending therefrom; and
    shelf socket means;
a wheel bracket;
an auxiliary wheel rotatably mounted upon said wheel bracket;
a wheel stem extending from said wheel bracket; and
wherein when said columns are engaged with said stub brackets, said top section rests upon said bottom section in a position to receive a grill for use in said top section; and
further wherein said stems are removably insertable into corresponding ones of said top section socket means to dispose said shelf horizontally connected to said top section, and wherein said wheel stem is removably insertable into said shelf socket means to removably attach said auxiliary wheel to said shelf.

2. An apparatus according to claim 1 wherein said grill support comprises hollow metal tubing and said socket means comprises an open end of said tubing.

3. An apparatus according to claim 1 wherein said shelf comprises hollow metal tubing and said socket means upon said shelf comprises an open end of said tubing.

4. An apparatus according to claim 1 wherein said top ends of at least a first pair of said columns are tapered.

5. An apparatus according to claim 4 wherein a first pair of said stub brackets are pivotal about said tapered top ends when a second pair of said stub brackets are disengaged from a second pair of said columns.

6. A stand for a barbecue grill, comprising
a top section for receiving and holding a grill, said top section comprising a frame having four legs extending downward therefrom and brackets disposed near the lower ends of said legs, said top section temporarily engageable with a bottom section having four vertically extending columns, and said top section having brackets thereon into which the top ends of said columns are removably insertable
at least one shelf having stems extending therefrom;
socket means upon said top section;
socket means upon said shelf;
a wheel bracket;
an auxiliary wheel rotatably mounted upon said wheel bracket; and
a wheel stem extending from said wheel bracket;
wherein said stems are removably insertable into corresponding ones of said socket means to dispose said shelf horizontally connected to said top section; and
wherein said wheel stem is removably insertable into said socket means upon said shelf to removably attach said auxiliary wheel to said shelf.

7. An apparatus according to claim 6 wherein said top ends of at least a first pair of said columns are tapered.

8. An apparatus according to claim 7 wherein a first pair of said brackets are pivotal about said tapered top ends when a second pair of said brackets are disengaged from a second pair of said columns.

* * * * *